United States Patent [19]

Maschino

[11] Patent Number: 4,841,130

[45] Date of Patent: Jun. 20, 1989

[54] ODOMETER

[75] Inventor: Dale C. Maschino, Burton, Mich.

[73] Assignee: General Motors Corporation, Detroit, Mich.

[21] Appl. No.: 220,288

[22] Filed: Jul. 18, 1988

[51] Int. Cl.⁴ ............................................. G01C 22/00
[52] U.S. Cl. .................................... 235/96; 235/1 C; 235/117 R; 235/131 JA
[58] Field of Search .................. 235/1 C, 95 R, 95 B, 235/96, 117 R, 131 R, 131 FD, 131 JA, 139 A, 142, 143

[56] References Cited

U.S. PATENT DOCUMENTS

| | | | |
|---|---|---|---|
| 3,137,444 | 8/1961 | Harada | 235/117 R |
| 3,583,629 | 6/1971 | Heidel | 235/96 |
| 3,965,847 | 6/1976 | Deming | 116/62.4 |
| 4,015,109 | 3/1977 | Deming | 235/96 |

Primary Examiner—B. R. Fuller
Attorney, Agent, or Firm—R. L. Phillips

[57] ABSTRACT

A disk on a wheel-type odometer assembly is provided with a integral spring pawl that operates with the normally provided transfer teeth on the highest number wheel to effect a positive detent that prevents this last wheel from backward droop.

3 Claims, 2 Drawing Sheets

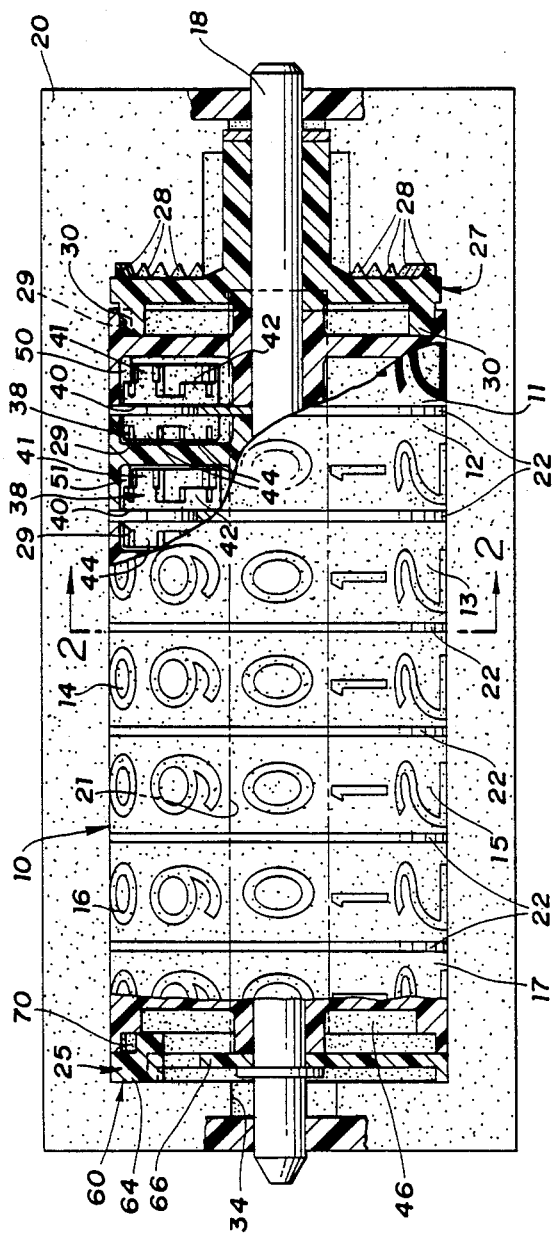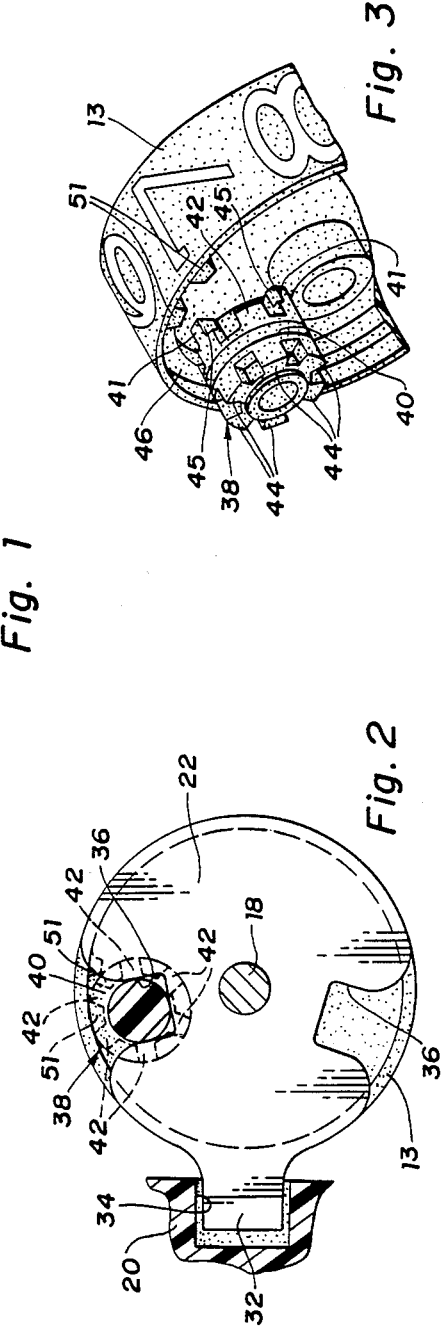
Fig. 1
Fig. 2
Fig. 3

ODOMETER

TECHNICAL FIELD

This invention relates to odometers and more particularly to wheel-type odometers for use in motor vehicles to register the distance traveled.

BACKGROUND OF THE INVENTION

In wheel-type odometers such as those currently used in motor vehicles to register the distance traveled, there is typically employed in a 100,000.0 mileage indicator one decimal wheel, six digit wheels and a plurality of pinion carrier-pinion gear sets equal in number to the figure wheels to transfer drive therebetween. In a conventional assembly, the pinion carriers fit between the wheels and each have a tab that fits into a channel in an odometer module frame to prevent carrier rotation. And the pinion gears have a circular groove by which they are rotatably supported in notches in the respective pinion carriers at a specified angle from the tabs; this to control their position in the module assembly. Each pinion gear has three locking and three transfer teeth on one side and six drive teeth on the other.

The locking teeth of each pinion gear fit into a locking ring inside one surface of respective wheel and within design tolerances, a certain amount of pinion gear rotation is possible. Each wheel to the left also has an internal gear engaged with the drive teeth of an adjacent pinion gear and within design tolerances a certain amount of wheel rotation is possible before wheel transfer has begun. Each of the wheels as observed from right to left thus has an accumulative angular rotation possible because of the clearances in the locking teeth and drive teeth in each of the previous wheels. As a result, the extreme left hand or 100,000 mile wheel has the greatest amount of clearance. Moreover, there may be because of the design of the pinion gear and wheel gears, additional transfer gear clearance when the wheel digits are at "0" causing the wheel member numerals to appear lower than the odometer's normal centerline. After a period of operation time, the odometer shaft which rotates inside each wheel works against these rotational clearances to bring all the wheels into alignment. In the meantime, there will be progressive so-called "backward" droop reading right left and it has long been a desire to limit the maximum amount of backward droop of the numeral "0" on the 100,000 mile wheel to a substantially smaller amount than the summation of all the wheel gear and pinion gear clearances.

SUMMARY OF THE INVENTION

The present invention offers a cost effective solution to the above noted droop problem with a simple modification of a disk which heretofore only served to block light at the left end of the odometer and did not operatively engage the wheels. This is accomplished with a simple modification of this disk by adding a tab same as on the carriers to prevent disk rotation and in addition forming a spring supported pawl integral with the disk that engages a lower edge of the transfer teeth on the leftmost or 100,000 mile wheel so that when the odometer is rolled over from 999,999.9 to 000,000.0 at assembly this pawl is caused to move inward and then allowed to spring outward to engage a transfer tooth to lock the wheel against backward droop. In addition, where there is provided a breakable retainer for the carrier tabs, such retainer is also modified to then have an additional section so as to accommodate the disk tab as well. Otherwise, such a conventional odometer assembly can remain the same and with the backward droop thus very cost effectively prevented from occurring.

It is therefore an object of the present invention to provide a new and improved wheel-type odometer wherein backward droop of the highest reading wheel is cost effectively prevented.

Another object of the present invention is to provide in a wheel-type odometer a spring supported pawl arrangement that operates to limit backward droop on the last driven wheel to less than the sum of all the wheel gear and pinion gear clearances.

Another object of the present invention is to provide in a wheel-type odometer a modified disk that normally closed one end of the wheel assembly and is now prevented from rotation and operates through an integral spring supported pawl to hold the highest reading wheel in its correct position and prevent backward droop thereof from occurring.

These and other objects, advantages and features of the present invention will become more apparent from the following description and drawing in which:

FIG. 1 is a side view with parts broken away of an odometer assembly incorporating the preferred embodiment of the present invention.

FIG. 2 is a sectional view looking in the direction of the arrows 2—2 in FIG. 1.

FIG. 3 is an exploded partial view in perspective of one of the pinion gears and wheels in FIG. 1.

FIG. 6 is an enlarged sectional view looking in the direction of the arrows 6—6 in FIG. 1 showing the 100,000 mile wheel in its "0" digit position.

Figure 4:
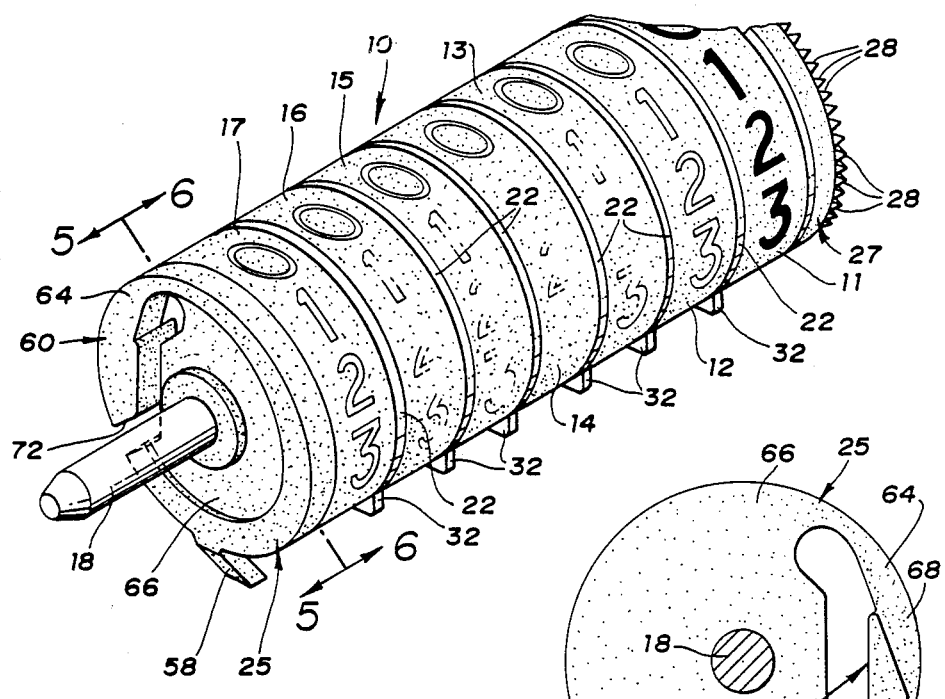
FIG. 4 is a perspective view of the odometer assembly in FIG. 1 showing the left hand end disk thereof.

Referring to FIGS. 1–4, the odometer wheel assembly there shown and generally identified as 10 has a one hundred thousand mile plus one decimal readout provided by a printed decimal wheel 11 and six printed digit wheels 12–17 which all have the numbers 0–9 printed thereon. The wheels which are all identical in construction and preferably plastic molded parts are coaxially mounted for rotation on a shaft 18 that is rotatably supported in a frame 20 that has a viewing aperture 21 as shown in phantom line through which a line of the numerals across the wheels may be viewed to read the mileage (see FIG. 1). In addition, there are also mounted on the shaft coaxial with the wheels, six identical stamped sheet metal pinion carrier plates 22 mounted between adjacent ones of the wheels, a plastic molded end disk 25 at the left end adjacent the highest counting wheel 17 and a plastic molded drive disk 27 at the opposite end adjacent the decimal wheel 11. The drive disk 27 is press-fitted on the shaft 18 and has teeth 28 about its exposed side by means of which it and thereby the shaft may be driven at reduced speed by an electric motor or shaft driven gear (not shown). In addition, the decimal wheel 11 has twenty internal teeth 29 as does the digit wheels as later described but these teeth are engaged between two diametrically opposed pins thereof by a correspondingly arranged pair of drive lugs 30 on the drive disk so that the decimal wheel is driven by and turns conjointly therewith.

The pinion carriers 22 freely receive the shaft 18 and each have a tab 32 which fits into a longitudinal channel 34 in the odometer frame to angularly locate and prevent the respective carrier from turning (see FIGS. 1 and 2). The carriers 22 further have two carrier support notches 36, only one of which is used and the other facilitating assembly. A pinion gear 38 is provided between each adjacent set of wheels and has an annular groove 40 by which it is rotatably supported in one of the notches 36 of the carrier between these wheels (see FIGS. 1–3). Each pinion gear 38 has three locking teeth 41 and six transfer teeth 42 on one side and six drive teeth 44 on the other side. The locking teeth 41 are extensions of alternate ones of the transfer teeth and have beveled tips 45 that fit into a locking ring 46 in the left side of each wheel. The locking teeth 41 are sequentially indexed into and out of a locking notch 48 in the associated ring by a single internal transfer tooth 50 in this same side of the wheel in the case of the decimal wheel 11 (see FIG. 1) or a pair of internal transfer teeth 51 in the case of all the digit wheels 12–17 (see FIGS. 2, 6 and 7). The internal teeth 50 and 51 are outward of their associated locking ring and in either case intermittently engage one of the transfer teeth 42 on the respective pinion during each rotation of the associated wheel to thereby index or turn the pinion one-third turn while the locking teeth are then indexed free of the locking notch with these events then repeated as the wheel continues to turn and with the angular location of the carrier tabs to the frame and that of the internal teeth 50 and 51 to the wheel numerals positioned to lock the wheels in advanced or increased mileage positions of correct reading relative to the viewing aperture.

Such incremental digit wheel advancement is caused by the drive teeth 44 on each pinion gear engaging the twenty internal tooth ring gear 29 formed in the right side of each wheel so that ten turns of a lower digit wheel causes one turn of the immediately higher digit wheel to the immediate left thereof.

The odometer assembly thus far disclosed, except for the decimal wheel and drive thereto, is similar to those disclosed in U.S. Pat. Nos. 3,137,444 and 3,965,847 assigned to the assignee of this invention and which are hereby incorporated by reference and to which reference is made for further understanding of the various features and also possible alternative designs. To help understand the present invention, it is particularly relevant to know that in such prior arrangements, a certain amount of pinion gear rotation is possible between adjacent wheels because of manufacturing tolerances. Moreover, each digit wheel has an accumulated angular movement possible because of the clearances in the locking teeth and drive teeth of each of the previous wheels. As a result, the extreme left hand wheel for the 100,000 mile indication has the greatest amount of clearance. And because of the design of the pinion and wheel gears, additional transfer gear clearances are included when the wheel digits are "0" thus allowing the wheel numerals to appear lower than the odometer's normal centerline of reading. After a period of time of operation, the odometer shaft which rotates inside the wheels works against these rotational clearances to bring all of the wheel numerals into alignment but in the meantime the numerals will progressively droop to the left to an extent that can be significant.

According to the present invention, the end disk 25 rather than just blocking off light into the odometer assembly and not heretofore operatively affecting the odometer wheel operation is now provided with a tab 58 the same as the wheels which fits in the frame channel 34 to prevent rotation of this disk. Furthermore, it is also contemplated that where a breakable retainer (not shown) is also used to capture the tabs on the wheels, such retainer would also be modified by enlarging a hole therein to accept the disk tab 58 in addition to the wheel tabs. Moreover, the end disk 25 as shown in FIGS. 1 and 5–7 is further provided with a spring arranged to engage the side of the transfer teeth 51 on the 100,000 wheel 17 so as to have the effect of preventing backward droop of this wheel rather than allowing that caused by the summation of all the wheel and gear clearances as seen in FIG. 6.

Figure 5:
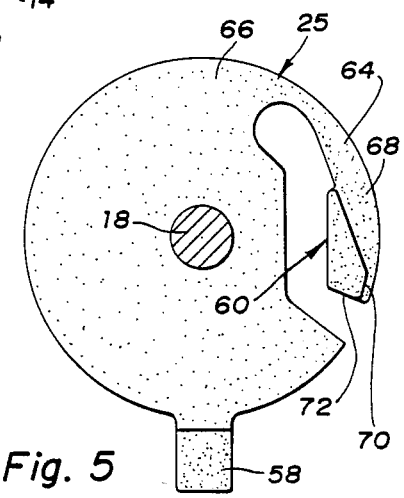
Figure 6:
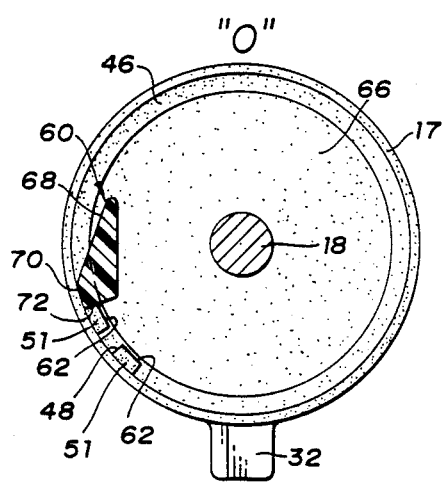
FIG. 6 is an enlarged sectional view looking in the direction of the arrows 5—5 in FIG. 4 showing the left hand end disk.
Figure 7:
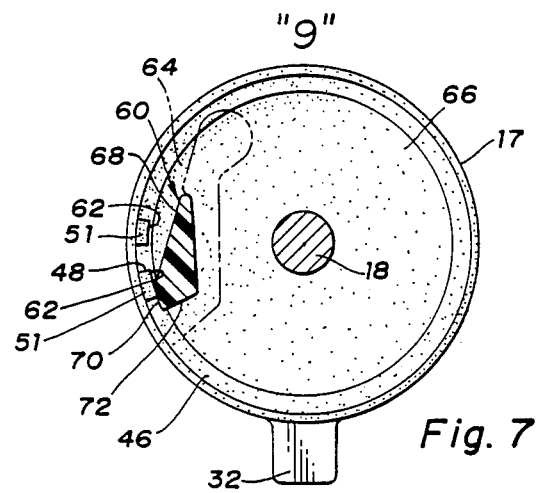
FIG. 7 is a view similar to the FIG. 6 but showing the 100,000 mile wheel being advanced from its "9" digit position toward the "0" digit position.

Referring to FIGS. 1, 4 and 5, the spring supported pawl 60 is preferably formed integral with the disk and comprises a cantilever arm 64 that extends angularly from the body 66 of the disk in the normal or forward direction of wheel rotation (clockwise as viewed in FIG. 5). The terminal end of the cantilever arm 64 is formed with a pawl comprising a radially outwardly facing shallow ramp 68 that leads outward to a crest 70 having a radius of curvature from the center of the disk and coaxial 100,000 wheel. And the crest continues to a stop surface or side 72 that projects radially inward. At odometer assembly, the wheels are initially all set at 999,999.9 resulting in the "9" digit on the 100,000 wheel 17 being in the up position shown in FIG. 7. In this position, the ramp 68 of the pawl rests against the edge 62 of the first approaching transfer tooth 51 of the 100,000 wheel under a light spring load resulting from slight flexure then of the cantilever arm 64 in this relative position. The odometer is then caused to roll over from 999,999.9 to 000000.0 as is normally done to insure all odometer pinion gears are free to rotate. As this occurs, the ramp 68 is driven radially inward as shown in phantom line in FIG. 7 thereby flexing the integral plastic spring arm 64 inward. When the wheel is further rotated to position the "0" digit up as shown in FIG. 6, the two transfer teeth 51 of the 100,000 wheel move along and past the shallow ramp 68 of the pawl and then the crest 70 finally allowing the spring arm 64 to unflex or spring back which causes additional rotation of the 100,000 wheel so that the last of these teeth then comes to rest against the blunt stop side 72 of the pawl as seen in FIG. 6, thus removing gear backlash. Thereafter, any added tendency for the wheel to back up toward the "9" digit only applies pressure to the spring supported pawl 60 and because of the angle of the stop 72 and the opposing direction of its cantilever arm 64, no such movement can occur. Thus, the wheel is locked in its correct position to positively prevent backward droop of this last wheel from occurring.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:, 1. In an odometer assembly comprising a drive shaft, a plurality of digit wheels rotatably supported on said shaft, a plurality of carriers arranged between the respective wheels and coaxially mounted therewith on said shaft, means preventing said carriers from rotating, means drivingly connecting said drive shaft to a first one of said wheels, pinion gears rotatably supported on the respective carriers, said wheels having on one of two sides an internal ring and a pair of internal transfer teeth separated by a notch in said ring, said wheels having on the other side an internal ring gear, said pinion gears operable to transmit drive between adjacent ones of the wheels, said pinion gears having transfer teeth and locking teeth on one of two ends thereof that cooperate with said internal ring and said pair of teeth and said notch in the adjacent wheel to the right thereof and having drive teeth on the other end thereof that cooperate with said ring gear in the adjacent wheel to the left of said one wheel thereby to effect a ten to one reduction drive between each wheel and the immediate wheel to the left thereof and wherein the leftmost wheel is the highest indicating wheel, the improvement comprising an end disk mounted adjacent said leftmost wheel on said shaft, means preventing said end disk from rotating, and spring supported pawl means on said end disk for operatively engaging said pair of internal transfer teeth on said leftmost wheel as the latter said wheel is rotated in a forward direction to a zero indicating position to remove gear backlash initially and thereafter prevent backward rotation thereof.

2. In an odometer assembly comprising a drive shaft, a plurality of digit wheels rotatably supported on said shaft, a plurality of carriers arranged between the respective wheels and coaxially mounted therewith on said shaft, means preventing said carriers from rotating, means drivingly connecting said drive shaft to a first one of said wheels, pinion gears rotatably supported on the respective carriers, said wheels having on one of two sides an internal ring and a pair of internal transfer teeth separated by a notch in said ring, said wheels having on the other side an internal ring gear, said pinion gears operable to transmit drive between adjacent ones of the wheels, said pinion gears having transfer teeth and locking teeth on one of two ends thereof that cooperate with said internal ring and said pair of teeth and said notch in the adjacent wheel to the right thereof and having drive teeth on the other end thereof that cooperate with said ring gear in the adjacent wheel to the left of said one wheel thereby to effect a ten to one reduction drive between each wheel and the immediate wheel to the left thereof and wherein the leftmost wheel is the highest indicating wheel, the improvement comprising an end disk mounted adjacent said leftmost wheel on said shaft, means preventing said end disk from rotating, and spring supported pawl means on said end disk for operatively engaging said pair of internal transfer teeth on said leftmost wheel as the latter said wheel is rotated in a forward direction to a zero indicating position to remove gear backlash initially and thereafter prevent backward rotation thereof, said pawl means comprising a spring arm with a pawl at an end thereof and a ramp leading to said pawl, said pawl being contactable by the transfer teeth on said leftmost wheel to deflect said arm to clear said pawl of the latter teeth on forward rotation of the latter wheel and thereafter on continued forward rotation of the latter wheel to said zero position allow the arm to unflex and position the pawl to contact the trailing one of the latter teeth to thereafter positively prevent backward rotation of said leftmost wheel.

3. In an odometer assembly comprising a drive shaft, a plurality of digit wheels rotatably supported on said shaft, a plurality of carriers arranged between the respective wheels and coaxially mounted therewith on said shaft, means preventing said carriers from rotating, means drivingly connecting said drive shaft to a first one of said wheels, pinion gears rotatably supported on the respective carriers, said wheels having on one of two sides an internal ring and a pair of internal transfer teeth separated by a notch in said ring, said wheels having on the other side an internal ring gear, said pinion gears operable to transmit drive between adjacent ones of the wheels, said pinion gears having transfer teeth and locking teeth on one of two ends thereof that cooperate with said internal ring and said pair of teeth and said notch in the adjacent wheel to the right thereof and having drive teeth on the other end thereof that cooperate with said ring gear in the adjacent wheel to the left of said one wheel thereby to effect a ten to one reduction drive between each wheel and the immediate wheel to the left thereof and wherein the leftmost wheel is the highest indicating wheel, the improvement comprising an end disk mounted adjacent said leftmost wheel on said shaft, means preventing said end disk from rotating, and spring supported pawl means on said end disk for operatively engaging said pair of internal transfer teeth on said leftmost wheel as the latter said wheel is rotated in a forward direction to a zero indicating position to thereafter prevent backward rotation thereof, said pawl means comprising a spring arm integral with said end disk and extending angularly therefrom in said forward direction, said arm having a pawl at an end thereof and a ramp leading to said pawl, said pawl being contactable by the transfer teeth on said leftmost wheel to deflect said arm to clear said pawl of the latter teeth on forward rotation of the latter wheel and thereafter on continued forward rotation of the latter wheel to said zero position allow the arm to unflex and position the pawl to contact the trailing one of the latter teeth to thereafter positively prevent backward rotation of said leftmost wheel.

* * * * *